United States Patent [19]
Beck et al.

[11] Patent Number: 5,489,406
[45] Date of Patent: Feb. 6, 1996

[54] METHOD OF MAKING POLYVINYLIDENE FLUORIDE MEMBRANE

[75] Inventors: Thomas W. Beck, Glenhaven; Matthew B. Lee, Seven Hills, Richard D. Grant, Lane Cove, Robert J.W. Streeton, South Windsor, all of Australia

[73] Assignee: Memtec Limited, South Windsor, Australia

[21] Appl. No.: 946,496

[22] PCT Filed: May 9, 1991

[86] PCT No.: PCT/AU91/00198

§ 371 Date: Dec. 8, 1992

§ 102(e) Date: Dec. 8, 1992

[87] PCT Pub. No.: WO91/17204

PCT Pub. Date: Nov. 14, 1991

Related U.S. Application Data

[63] Continuation-in-part of Ser. No. 536,650, Jul. 9, 1990, Pat. No. 5,318,417, and a continuation-in-part of Ser. No. 941,376, Sep. 4, 1992, Pat. No. 5,277,851, which is a continuation of Ser. No. 536,649, Jul. 9, 1990, abandoned.

[30] Foreign Application Priority Data

May 9, 1990 [AU] Australia .................................. PK0036

[51] Int. Cl.[6] ..................................... D01D 5/247
[52] U.S. Cl. .................... 264/41; 264/209.1; 264/211; 264/211.25; 264/211.16; 264/558; 264/561; 264/562
[58] Field of Search ............................ 264/41, 49, 209.1, 264/211, 211.15, 211.16, 558, 561, 562

[56] References Cited

U.S. PATENT DOCUMENTS

| | | |
|---|---|---|
| 3,133,132 | 5/1964 | Loeb et al. . |
| 3,518,332 | 6/1970 | Sklarchuk et al. .................. 264/49 |
| 3,642,668 | 2/1972 | Bailey et al. . |
| 4,203,847 | 5/1980 | Grandine, II ........................... 210/490 |
| 4,203,848 | 5/1980 | Grandine, II ........................... 210/490 |
| 4,247,498 | 1/1981 | Castro ..................................... 264/41 |
| 4,399,035 | 8/1983 | Nohmi et al. . |
| 4,519,909 | 5/1985 | Castro . |
| 4,666,607 | 5/1987 | Josefiak et al. ........................ 210/640 |
| 4,810,384 | 3/1989 | Fabre ................................ 210/500.23 |
| 5,013,339 | 5/1991 | Mahoney et al. ................... 264/41 X |

FOREIGN PATENT DOCUMENTS

| | | |
|---|---|---|
| 8516082 | 1/1983 | Australia . |
| 1896588 | 1/1989 | Australia . |
| 2146488 | 3/1989 | Australia . |
| 5897490 | 1/1991 | Australia . |
| 1170010 | 7/1984 | Canada . |
| 223709 | 5/1987 | European Pat. Off. .......... 210/500.42 |
| 330072 | 8/1989 | European Pat. Off. . |
| 378441 | 7/1990 | European Pat. Off. . |
| WO90/05007 | 5/1990 | WIPO . |
| WO90/05006 | 5/1990 | WIPO . |

OTHER PUBLICATIONS

Abstract of Japan 51–6,268 (Published Jul. 5, 1974).

*Primary Examiner*—Leo B. Tantoni
*Attorney, Agent, or Firm*—Waldron & Associates

[57] ABSTRACT

A method of making a porous polymeric material by heating a mixture comprising polyvinylidene fluoride and a solvent system initially comprising a first component that is a latent solvent for polyvinylidene fluoride and a second component that is a non-solvent for polyvinylidene fluoride wherein, at elevated temperature, polyvinylidene fluoride dissolves in the solvent system to provide an optically clear solution. The solution is then rapidly cooled so that non-equilibrium liquid-liquid phase separation takes place to form a continuous polymer rich phase and a continuous polymer lean phase with the two phases being intermingled in the form of bicontinuous matrix of large interfacial area, and cooling is continued until the polymer rich phase solidifies. The polymer lean phase is removed from the solid polymeric material. A porous material so prepared is characterised by a lacey or filamentous structure consisting of a plurality of polymer strands (1) connected together at a number of locations (2) spaced apart along each strand.

12 Claims, 9 Drawing Sheets

METHOD OF MAKING POLYVINYLIDENE FLUORIDE MEMBRANE

This application is a Continuation-in-Part of applicant's applications, U.S. Ser. No. 07/536,650, filed Jul. 9, 1990 and having an International Filing Date of Nov. 10, 1989, now U.S. Pat. No. 5,318,417, issued Jun. 7, 1994, and U.S. Ser. No. 07/941,376, filed Sep. 4, 1992, now U.S. Pat. No. 5,277,851, issued Jan. 11, 1994, which is in turn a Continuation of U.S. Ser. No. 07/536,649, filed Jul. 9, 1990 and having an International Filing Date of Nov. 10, 1989, now abandoned, benefit of which are hereby claimed under the provisions of 35 U.S.C. 120.

FIELD OF INVENTION

This invention relates to porous polymeric membranes and more particularly to such membranes that are prepared from polyvinylidene fluoride.

Polyvinylidene fluoride is a well known polymer of general formula $(C_2H_2F_2)_n$. It has the advantages of strength and oxidation resistance.

BACKGROUND ART

Polymeric membranes may be prepared by the phase inversion technique which commences with the formation of a molecularly homogeneous, single phase solution of a polymer in a solvent. The solution is then allowed to undergo transition into a heterogeneous, metastable mixture of two interspersed liquid phases one of which subsequently forms a gel. Phase inversion can be achieved by solvent evaporation, non-solvent precipitation and thermal precipitation.

The quickest procedure for forming a microporous system is thermal precipitation of a two component mixture, in which the solution is formed by dissolving a thermoplastic polymer in a solvent which will dissolve the polymer at an elevated temperature but will not do so at lower temperatures. Such a solvent is often called a latent solvent for the polymer. The solution is cooled and, at a specific temperature which depends upon the rate of cooling, phase separation occurs and the liquid polymer separates from the solvent.

All practical thermal precipitation methods follow this general process which is reviewed by Smolders et al in Kolloid Z.u.Z Polymer, 43, 14–20 (1971). The article distinguishes between spinodal and binodal decomposition of a polymer solution.

The equilibrium condition for liquid-liquid phase separation is defined by the binodal curve for the polymer/solvent system. For btnoda/decomposition to occur, the solution of a polymer in a solvent is cooled at an extremely slow rate until a temperature is reached below which phase separation occurs and the liquid polymer separates from the solvent.

It is more usual for the phases not to be pure solvent and pure polymer since there is still some solubility of the polymer in the solvent and solvent in the polymer, there is a polymer rich phase and a polymer poor phase. For the purposes of this discussion, the polymer rich phase will be referred to as the polymer phase and the polymer poor phase will be referred to as the solvent phase.

When the rate of cooling is comparatively fast, the temperature at which the phase separation occurs is generally lower than in the binodal case and the resulting phase separation is called spinodal decomposition.

According to the process disclosed in U.S. Specification No. 4,247,498, the relative polymer and solvent concentrations are such that phase separation results in fine droplets of solvent forming in a continuous polymer phase. These fine droplets form the cells of the membrane. As cooling continues, the polymer freezes around the solvent droplets.

As the temperature is lowered, these solubilities decrease and more and more solvent droplets appear in the polymer matrix. Syneresis of the solvent from the polymer results in shrinkage and cracking, thus forming interconnections or pores between the cells. Further cooling sets the polymer. Finally, the solvent is removed from the structure.

Known thermal precipitation methods of porous membrane formation depend on the liquid polymer separating from the solvent followed by cooling so that the solidified polymer can then be separated from the solvent. Whether the solvent is liquid or solid when it is removed from the polymer depends on the temperature at which the operation is conducted and the melting temperature of the solvent.

True solutions require that there be a solvent and a solute. The solvent constitutes a continuous phase and the solute is uniformly distributed in the solvent with no solute-solute interation. Such a situation is almost unknown with the polymer solutions. Long polymer chains tend to form temporary interactions or bonds with other polymer chains with which they come into contact. Polymer solutions are thus rarely true solutions but lie somewhere between true solutions and mixtures.

In many cases it is also difficult to state which is the solvent and which is the solute. In the art, it is accepted practice to call a mixture of polymer and solvent a solution if it is optically clear without obvious inclusions of either phase in the other. By optically clear, the skilled artisan will understand that polymer solutions can have some well known light scattering due to the existence of large polymer chains. Phase separation is then taken to be that point, known as the cloud point, where there is an optically detectable separation. It is also accepted practice to refer to the polymer as the solute and the material with which it is mixed to form the homogeneous solution as the solvent.

There are several characteristics in the morphology of a membrane that can describe what is observed when phase inversion membranes are scrutinised under an electron microscope. The morphological characteristics may be described with the terms symmetry, homogeneity and isotropy.

Symmetry means that one half of the structure is the mirror image of the other half. The device about which a membrane is symmetrical is a plane or surface half way between the two faces of the membrane. In membrane science, the term is often incorrectly used to mean homogeneous. Homogeneous means simply that the membrane has a uniform structure. In chemistry, the term "homogeneous", when ascribed to a substance, means that it has uniform structure or composition.

Isotropic means that the membrane has equal properties in all directions. The word isotropic comes from biology where it is means a tendency for equal growth in all directions.

The opposite of these terms are often used, namely—asymmetric, non-homogeneous and anisotropic. Anisotropic is often incorrectly understood to mean asymmetric or non-homogeneous. Anisotropic more currently describes how a morphology develops rather than the nature of the morphology.

In membrane science, the meaning of the above words has been refined by technological development. Prior to about 1960, phase inversion membranes were isotropic or only slightly anistropic. About that time, membranes with more inhomogeneity were developed.

Taking a vector from one face of a membrane to another, there are two types of inhomogeneity of importance known in membrane science as skinning and anisotropy.

Skinning is used as a synonym for asymmetry, and refers to a membrane having a relatively thin dense layer at one surface of the membrane with a relatively thick porous substructure throughout the remainder of the membrane. The first skinned membrane made by phase inversion is described in U.S. Specification No. 3,133,132 which discloses the solvent intrusion method of phase inversion.

In addition to the terms used to describe how one region of porous membrane is related to another, there are more specialised terms used in describing the shapes of the pores themselves.

Membrane scientists use the word structure when referring to the shapes of pores, cells, alveoli and other void shapes found within the membrane. The structure can be described as granular, spongy, reticulate, or lacey. The voids can be described as cells, or cells with interconnecting pores, and larger cavities can be described as macrovoids.

When viewed under an electron microscope, granular structures are characterised by polymer balls roughly spherical in shape which appear to be fused together as if sintered. Granular structures are not generally desirable in microporous membranes because the porosity and mechanical strength are both lower than other types of structure.

A spongy structure is characterised by roughly spherical cells connected by roughly cylindrical conduits or pores. Such a structure is disclosed in U.S. Specification No. 4,519,909.

A reticulate structure is characterised by a netlike appearance.

On the other hand, the polymertc material which forms the substance of a lacey structure can be described as multiply connected strands of polymer, with each connection point having only slightly larger dimensions that the cross-section of the strands. The strands have a length substantially larger than the largest cross-sectional dimension, and the shape of the cross-section of the strands varies from strand to strand as well as along the strand. The shape of the cross-section of the strands can be described as round or ensiform, circular or oval. The strands may have grooves or furrows, or even appear to be like a multiplicity of coalsaced filaments.

All of the above structures are bicontinuous in the solid state in that every part of the polymer is connected to every other part of the polymer, and every cavity is connected to every other cavity in an intermingled porous network of polymer and cavity.

As well as the above structures, interposed upon granular, spongy and lacey structures there can be cavities of substantially larger dimensions than those described earlier, and these cavities are referred to as macrovoids. Macrovoids which are elongated in shape are called finger voids, and macrovoids which are rounder in shape are called alveoli.

Macrovoids are, by definition, completely surrounded by the microporous structure of the membrane.

Several membranes made of polyvinylidene fluoride have been cited in the literature. Most are sheet membranes which are made by the common process of non-solvent (or poor solvent) intrusion to cause Gelation or phase inversion.

For example, U.S. Pat. No. 3,642,668 discloses dimethyl sulfoxide (DMSO) or dimethyl acetamide (DMAc) as the solvent for polyvinylidene fluoride when casting a membrane onto a support structure, immediately followed by immersion in a non-solvent bath, typically methanol.

Japanese Patent No. 51-8268 uses cyclohexanone as a solvent for polyvinylidene fluoride. The solution is heated and then cooled during which time the solution passes through a region of maximum viscosity. The membrane is cast when the viscosity of the solution is decreasing.

European Patent No. 223,709 discloses a mixture of acetone and dimethyl formamide (DMF) as a preferred solvent although all the usual standard or active solvents such as ketones, ethers such as tetrahydrofuran and 1,4 dioxane, and amides such as DMF, DMAC and DMSO are described. The membrane is formed by coating the polymer solution onto a substrate which is immediately immersed in a poor solvent.

In the process disclosed in U.S. Pat. No. 4,203,847 flat sheet membranes are formed by casting a nearly saturated solution in hot acetone onto a moving belt which then passes into a forming bath containing a mixture of solvent and non-solvent. This produces a thin skinned membrane. U.S. Pat. No. No. 4,203,848 describes the belt and machine used in this process.

U.S. Pat. No. 3,518,332 discloses a flat sheet membrane made by pressing and sintering a mixture of polyvinylidene fluoride particles with particles of a metallic salt and paraffin wax.

U.S. Pat. No. 4,810,384 describes a process wherein polyvinylidene fluoride and a hydrophilic polymer compatible therewith are dissolved in a mixture of lithium chloride, water and dimethylformamide, then cast onto a web and coagulated by passing the film through a water bath. A hydrophilic membrane that is a blend of the two polymers is produced.

U.S. Pat. No. 4,399,035 discloses a polyvinylidene fluoride membrane prepared by casting a dope comprising polyvinylidene fluoride, an active solvent such as DMAc, N-methylpyrrolidone or tetramethylurea and a minor amount of a surfactant or mixture of surfactants into a non-solvent bath, typically water or an alcohol. Polyethylene glycol and polypropylene glycol are used as surfactants and glycerin fatty acid esters are mentioned in the description as being suitable.

U.S. Pat. No. 4,666,607 describes a thermal gelation process. It discloses the use of a quench tube in the form of a U-tube, or a tank with the fibre moving as if in a U-tube, which can be used to produce polyvinylidene fluoride films or hollow fibres by extrusion of a solution comprising the polymer, solvent(s) and a non-solvent above the temperature at which the solution will separate into two phases, advantageously through an air gap into a cooling liquid in the quench tube or tank. In the case of hollow fibres, a lumen forming fluid (which is not a solvent for the polymer) is employed.

Emphasis is placed on the avoidance of stress on the extruded, but still liquid, fibre and the stretch factor (i.e. the ratio of the velocity of the formed, cooled fibre membrane to the velocity of the polymer solution emerging from the forming die) is typically in the region of only 1.33.

DISCLOSURE OF THE INVENTION

According to the invention, there is provided a method of making a porous polymeric material comprising the steps of:

(a) heating a mixture comprising polyvinylidene fluoride and a solvent system initially comprising a first component that is a latent solvent for polyvinylidene fluoride and a second component that is a non-solvent for polyvinylidene fluoride wherein, at elevated temperature, polyvinylidene fluoride dissolves in the solvent system to provide an optically clear solution, (b) rapidly cooling the solution so that non-equilibrium liquid-liquid phase separation takes place to form a continuous polymer rich phase and a continuous polymer lean phase with the two phases being intermingled in the form of bicontinuous matrix of large interfacial area, (c) continuing cooling until the polymer rich phase solidifies, (d) removing the polymer lean phase from the solid polymeric material.

A latent solvent is a solvent which will dissolve the polymer at an elevated temperature but allow the polymer to precipitate at lower temperatures.

Preferably, the latent solvent is a glycerol ester such as glycerol triacetate (KODAFLEX TRIACETIN®—a Trademark), glycerol tributyrate, glycerol tripropionate or partially-esterified glycerol).

The preferred latent solvent is glycerol triacetate (GTA).

The mixture may additionally contain an antioxidant. Possible antioxidants are selected from the group of hindered phenol antioxidants. Preferred antioxidants are ETHANOX 330® 1,3,5-trimethy-2,4,6-tris-3,5-di-tert-butyl-4-hydroxybenzyl) benzene) and ULTRANOX TM® (Bis (2,4-di-tert-butyl phenyl) pentaerythritol diphosphite) or mixtures thereof. Ethanox 330 is particularly preferred.

Typically, the mixture is heated for about 1 to about 20 hours under a pressure substantially below atmospheric that is governed by the vapour pressure of the solvent system.

The non-solvent may be selected from high boiling point, somewhat polar and hydrogen bonding compounds such as higher alcohols, glycols and polyols.

The non-solvent may be glycerol, diethylene glycol, dipropylene glycol, polyethylene glycol or polypropylene glycol.

In a preferred form of the invention, the polyvinylidene fluoride is dissolved in a mixture of glycerol triacetate and diethylene glycol (known by the trivial name digol).

In this invention, a combination of polymer and a solvent system was employed from which, on rapid cooling, a bicontinuous matrix of two liquids was found to occur. With the correct solvent properties for a selected polymer, non-equilibrium liquid-liquid phase separation takes place to form a bicontinuous matrix of polymer rich and polymer lean phases. This is in contrast to the mechanism of nucleation and growth which occurs in prior art thermal precipitation phase inversion membranes. This is supported experimentally by differential scanning calorimetry (DSC) testing, which showed that there is neither an endotherm nor exotherm during the liquid phase separation as would be expected if nucleation/crystallization took place.

The present invention differs from most prior art in that it relies on gelling the polymer by lowering the temperature (i.e. thermal gelation), not on non-solvent intrusion. Consequently, the present invention cannot use an active solvent (one which will dissolve the polymer at any temperature) as was done largely in the prior art, but must use a solvent system that is or contains a latent solvent.

While not wishing to be bound by theory, it is believed that a chemical reaction occurs between the components of the solvent system. It has been shown, by both gas- and thin-layer chromatography, that a mixture of up to nine reaction products may be formed and it may be that the mixture of reaction products collectively, or some component or components of the reaction mixture, constitute the latent solvent for polyvinylidene fluoride.

According to a second aspect of the invention there is provided a porous polyvinylidene fluoride material characterised by a lacey or filamentous structure consisting of a plurality of polymer strands connected together at a number of locations spaced apart along each strand.

Typically, each connection point has only slightly larger dimensions than the cross-section of the strands. The length of each strand is from 5 to 50 times the diameter of the strand and the strands vary in cross-sectional shape from circular to elliptical, in the latter case the major axis of the ellipse may be up to five times the minor axis of the ellipse. The description "lacy or filamentous structure" may also be visualteed as a three dimensional rounded lace filet derived from a bicontinuous structure.

In prior art membranes, a spongy structure can be obtained from any system which has a miscibiltty gap, and open celled pore connections are due to shrinkage and syneresis, whereas according to the present invention, the lacey structure of controlled morphology can be obtained only where there is a liquid-liquid bicontinuous phase separation.

In a preferred form of the invention, the membrane is a hollow fibre membrane which has a lacey structure in which there is some orientation of the strands in the axial direction of the fibre so that when a lumenal gas backwash procedure is implemented to clean the fibres, certain dimensions of the interstices increase on average allowing any material lodged in the interstices to be easily dislodged. The interstices are of a generally axially elongated shape and when the gas backwash is applied, the interstices distort from the axially elongated shape into a generally square shape to enlarge the minimum dimension of the interstices. The gas backwash will also stretch the fibre to increase the minimum dimension of the interstices.

Advantageously, the gas backwash is applied by pulsing air for 1 to 5 seconds at a pressure of about 600 kPa through the lumen of a hollow fibre membrane to cause explosive decompression through the walls of the fibre, thereby dislodging retained solids from the fibre. This gas backwash may be preceded by a pressurised reverse flow of liquid.

In a preferred form of the invention, the porous polyvinylidene fluoride material is formed as a hollow fibre using a quadruple co-extrusion head having four concentric passageways. The axial passageway contains a lumen forming fluid. The first outwardly concentric passageway contains a homogenous mixture of the polymer and solvent system to form the membrane, the next outwardly concentric passageway has a coating fluid and the outermost passageway has a cold quench fluid. Preferably, the lumen, coating and quenching fluids contain the solvent system components in selected proportions (the first component may be absent). The composition of the coating and lumen fluids predetermine the pore size and frequency of pores on the membrane surfaces.

Each fluid is transported to the extrusion head by means of individual metering pumps. The four components are individually heated and are transported along thermally insulated and heat traced pipes. The extrusion head has a number of temperature zones. The lumen fluid, membrane forming solution (dope) and coating fluid are brought to substantially the same temperature in a closely monitored temperature zone where the dope is shaped. The quench fluid is introduced at a substantially lower temperature in a cooling zone where the dope undergoes non-equilibrium liquid-liquid phase separation to form a bicontinuous matrix of large interfacial area of two liquids in which the polymer rich phase is solidified before aggregated separation into distinct phases of small interfacial area can take place.

Preferably, any air, gas or vapour (not being a gas or vapour that serves as the lumen fluid), is excluded during extrusion and the fibre is stressed axially to stretch it by a factor ranging from 5 to 100, thereby elongating the surface pores.

It is to be noted that the fibre travels down the quench tube at a significantly different linear speed from the quench fluid. The extruded fibre travels at a speed three to four times faster than the average speed of the quench fluid. Such a speed difference calculated on the average speed also means that the fibre travels at a speed about double the maximum speed of the quench fluid. The average and maximum speed of the quench fluid above are taken as the speed with no fibre present.

The hollow fibre membrane leaves the extrusion head completely formed and there is no need for any further formation treatment except for removing the solvent system from the membrane in a post-extrusion operation that is common to membrane manufacturing process. In a preferred method, an appropriate solvent that does not dissolve the polymer but is miscible with the dope solvents is used to remove the solvent system for the polymer from the finished membrane. In a particularly preferred method, water at 80°–100° C. is used.

The lumen forming fluid may be selected from a wide variety of substances such as soybean oil and an inert gas such as nitrogen. The same substance may be used as the coating and quenching liquids. Water or virtually any other liquid may be used as the quench liquid. Other substances which may be used as the lumen forming material, the coating liquid and the quenching liquid include:

(a) dioctylphthalate and other phthalate esters of alcohols of six carbon atoms or more (b) diethylene glycol (c) dipropylene glycol (d) diethylene glycol and glycerol triacetate (e) dipropylene glycol and glycerol triacetate (f) polyethylene glycol (g) polypropylene glycol.

BRIEF DESCRIPTION OF THE DRAWINGS

In order that the invention may be more readily understood and put into practical effect, reference will now be made to the accompanying drawings in which:

Referring to FIGS. 1a and 2a, the resemblance of the surface of the membrane to lace material can be seen. The polymer strands are joined together at intervals by bridges of polymeric material just as in a lacey handkerchief or the like.

Figure 1A:
FIG. 1a is a micrograph of the surface of the membrane produced in example 1.

As can be seen, the strand does not broaden substantially at the connection point between the strand and the bridge. Orientation of the strands in the axial direction of the fibre is clearly evident in FIG. 1a where all of the strands run almost parallel in the axial direction.

Figure 1B:
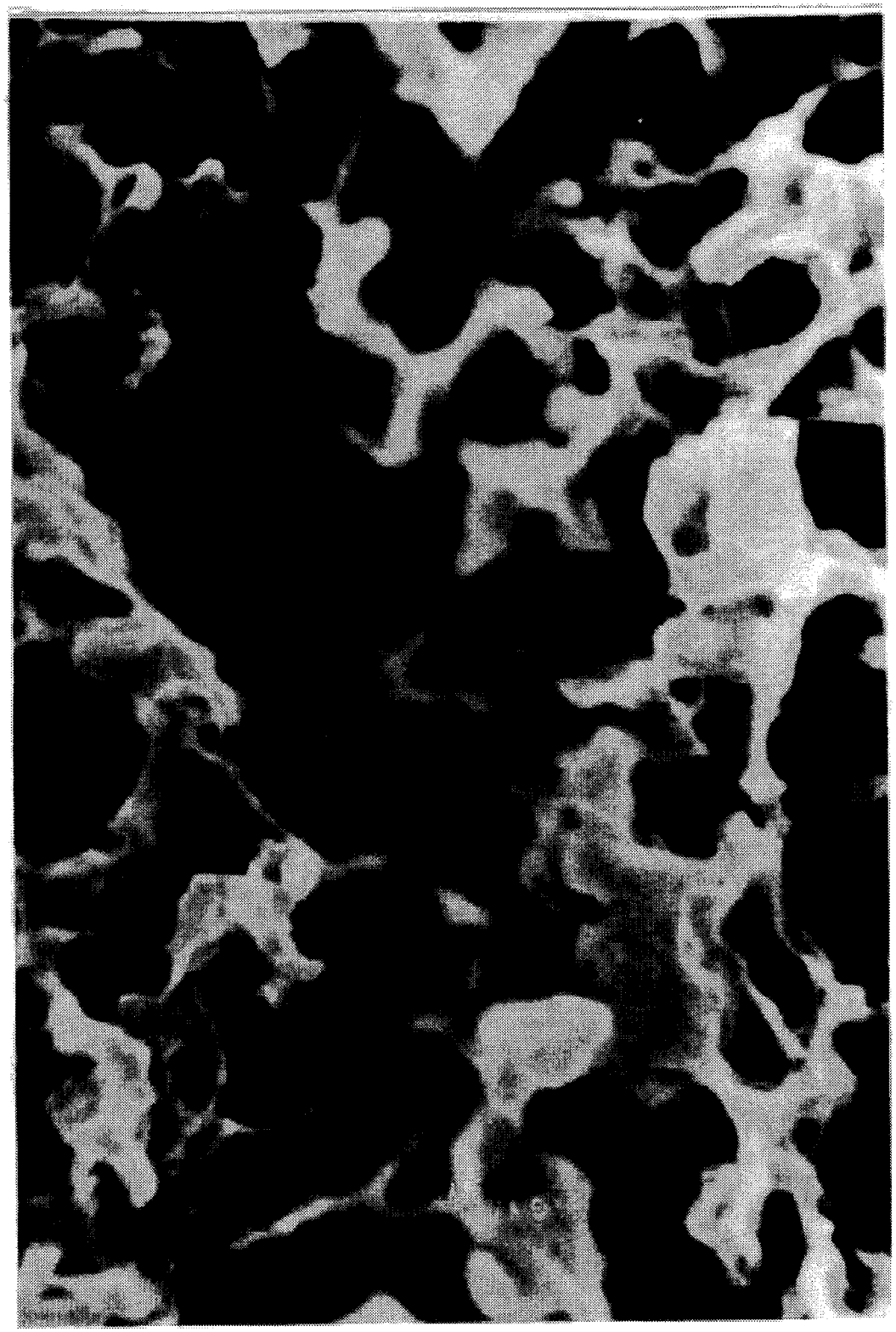
FIG. 1b is a micrograph of a cross section of the membrane of example 1.
Figure 2A:
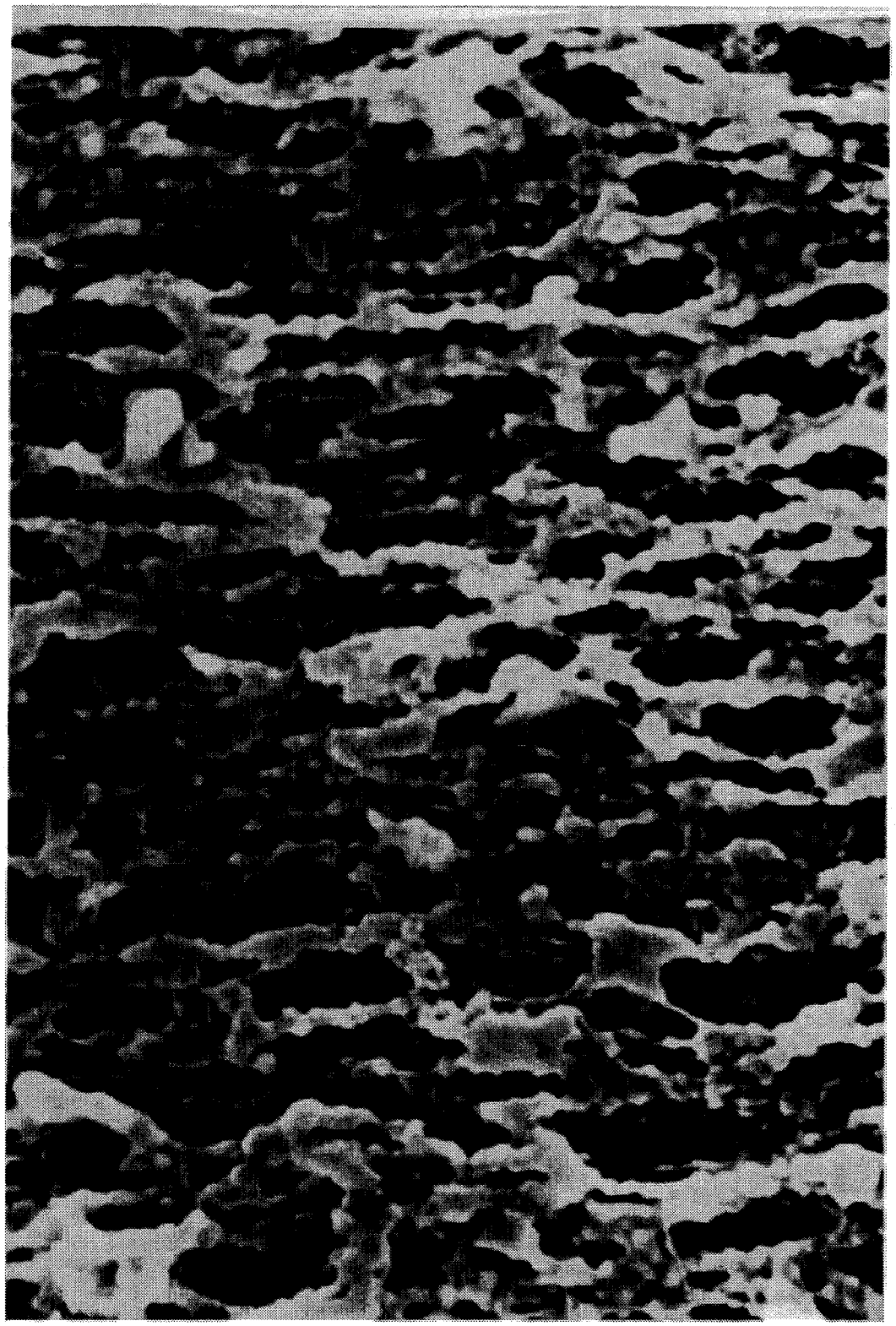
FIG. 2a is a micrograph of the surface of the membrane produced in example 2.
Figure 2B:
FIG. 2b is a micrograph of a cross section of the membrane produced in example 2.

An alveolus (singular of alveoli) is present in FIG. 1b.

Figure 3:
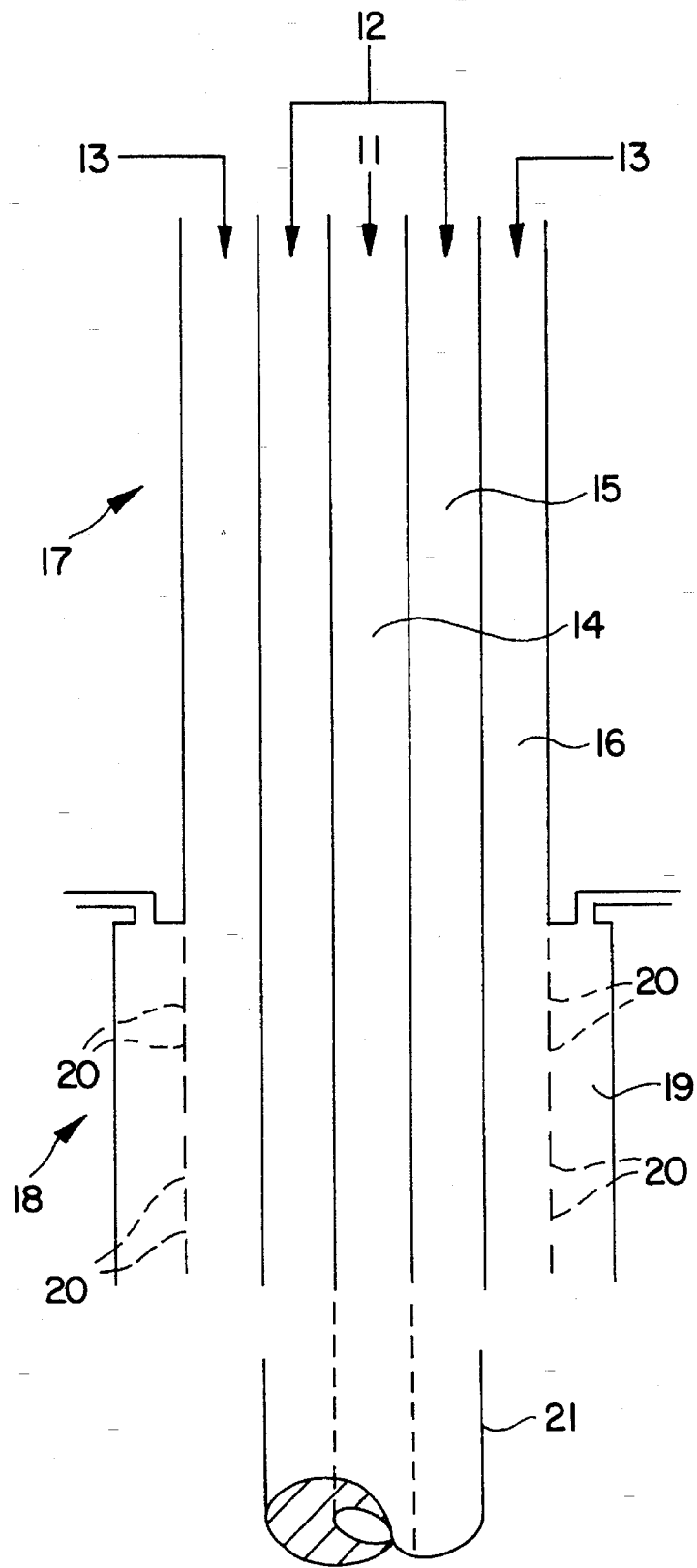
FIG. 3 is a schematic diagram of an extrusion die according to the invention.
Figure 4:
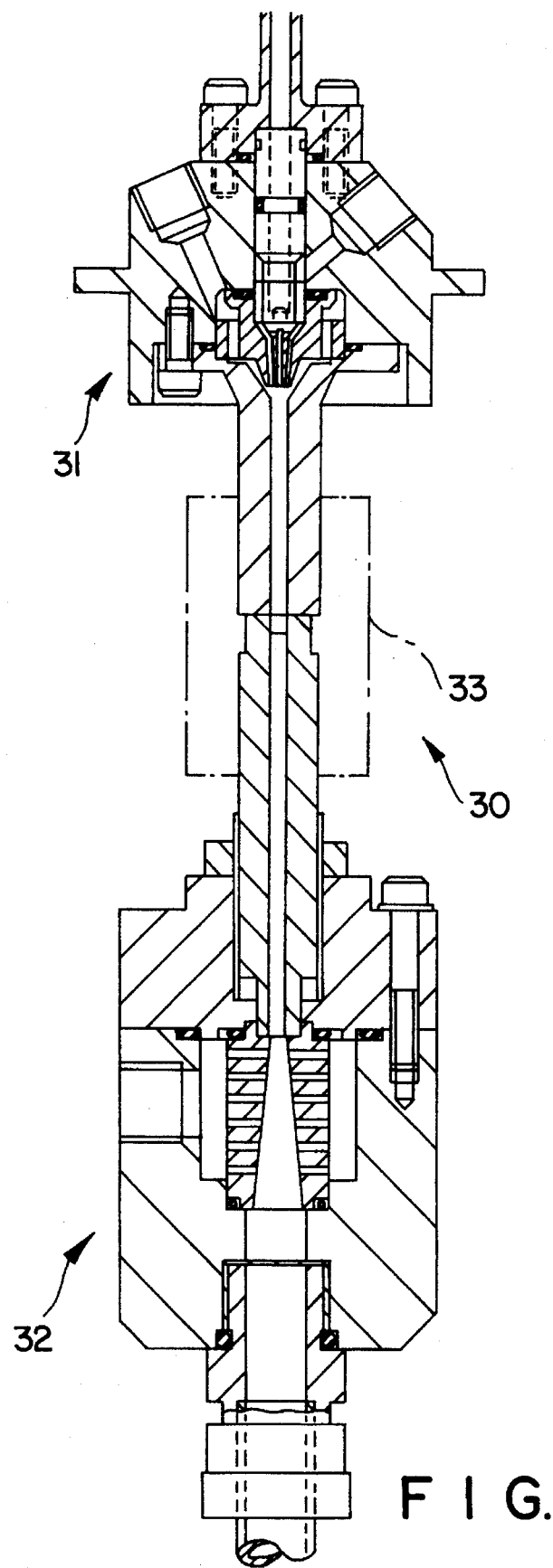
FIG. 4 is a cross-sectional view of an extrusion die assembly according to one embodiment of the invention.

The extrusion die shown in schematic form in FIG. 3 has, at its upper end, three concentric passageways 11, 12 and 13. The axial passageway 11 carries a lumen fluid 14, the inner annular passageway 12 carries an optically clear solution (or dope) 15 of polyvinylidene fluoride and solvent system and the outer annular passageway 13 carries a hot coating fluid 16. The thick lines in FIG. 3 represent walls and the thin lines represent interfaces between the various fluids.

The upper portion 17 of the extrusion die is a closely monitored temperature zone. Within the hot zone 17, the coating material remains as a coating on the membrane 21 being formed and modifies the surface of the membrane 21 to provide a porous surface on the membrane.

Below the hot zone 14 there is a cooling zone 18 which includes an annular quench fluid passageway 19. The quench fluid is pumped through the quench passageway 19 at a fixed rate and the coolant or quench fluid is not open to the atmosphere. The inner wall of quench passageway 19 has a series of openings 20 through which the quench fluid passes. Beyond the extrusion die there is a collector for receiving the extruded membrane 21.

An extrusion die assembly 30 according to one embodiment of the invention is shown in FIGS. 4 to 7 and consists of an upper or melt die portion 31 and a lower or quench tube die portion 32 coupled together by a union 33.

Figure 5:
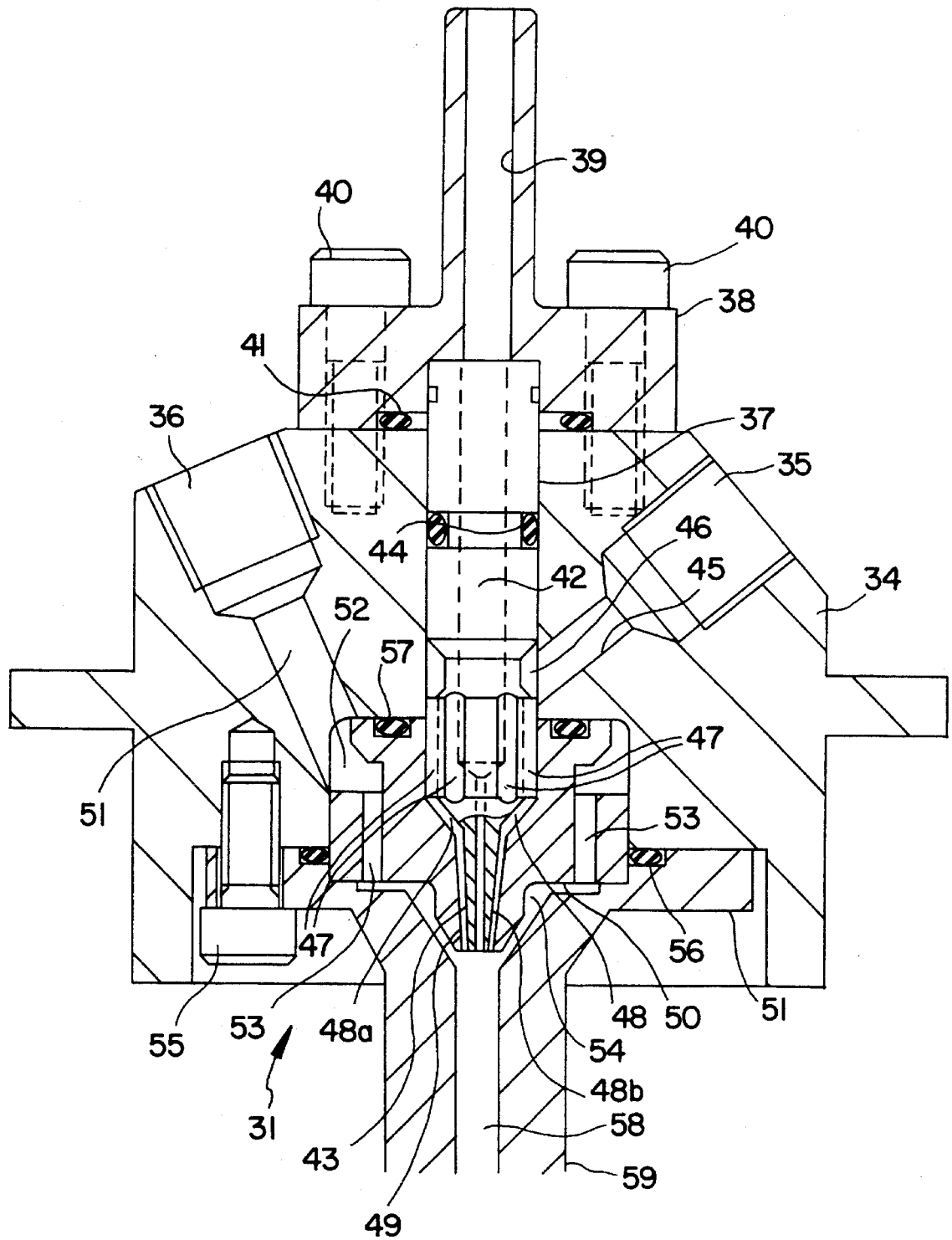
FIG. 5 is an enlarged cross-sectional view of the upper or melt die portion of the extrusion die assembly of FIG. 4, and, FIG. 6 is an enlarged cross-sectional view of the lower or quench tube portion of the extrusion die shown in FIG. 4.

The melt die portion 31 which is shown on an enlarged scale in FIG. 5, has a body 34 having an inlet 35 for receiving membrane forming dope and an inlet 36 for receiving coating fluid. The body has a central bore 37 and at its upper end there is a closure plate 38 having an axial passageway 39 for receiving a lumen forming fluid. The plate 38 is secured to the body 34 by bolts 40 and a seal is provided by "O" ring 41.

Within the central bore 37 of the body 34 there is a nozzle member 42 which depends from the plate 38. The axial passageway 39 is reduced in diameter at its lower end where it passes through the tapered end 43 of the nozzle member 42. The nozzle member 42 is sealed in the body 34 by "O" ring 44. The passageway 39 corresponds to passageway 11 of FIG. 3.

Figure 7:
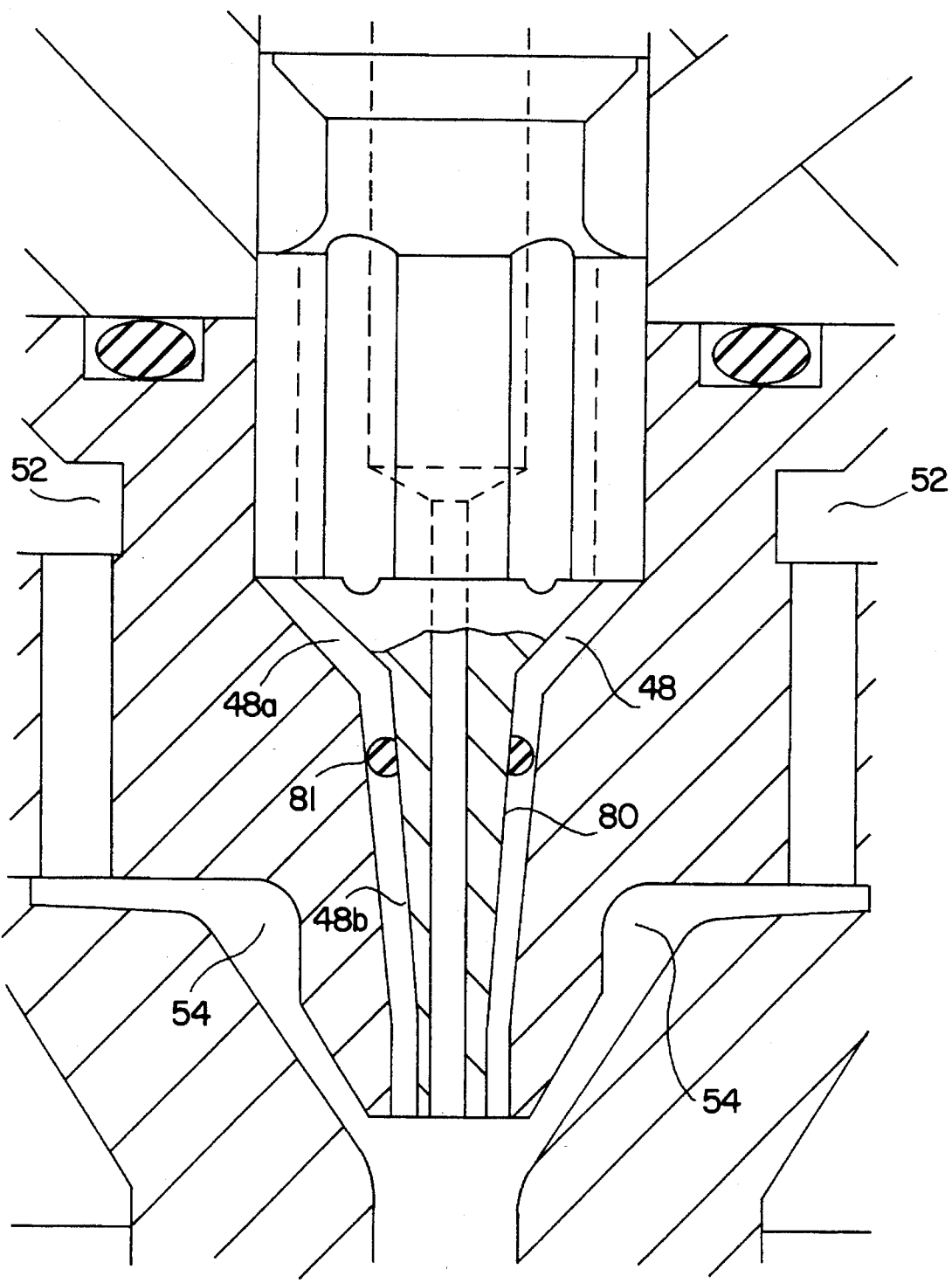
FIG. 7 is an enlarged cross-sectional view of the discharge nozzle of the melt die portion of the extrusion die assembly shown in FIG. 4.

The dope inlet 35 leads to a dope delivery passageway 45 in communication with an annular chamber 46 formed in the outer surface of nozzle 42. Dope is discharged from the chamber 46 into passageway 47 which exits into a tapered annular fibre forming tube 48 defined between the outer face of the nozzle 42 and a recess 49 formed in die plate 50. As can be seen in FIGS. 5 and 7 the fibre forming tube 48 has an upper conical portion 48a and a lower conical portion 48b. The upper portion 48a is inclined at a larger angle to the vertical than the lower portion 48b. In this instance, the angle of inclination of the upper portion is from 30° to 60° from the axis and that of the lower portion is from 1° to 10° from the axis. In the preferred embodiment, the angle from the axis on the upper portion of nozzle 42 is 44° and on the upper portion of the die plate 50 is 50° and on the lower portion of nozzle 42 is 3° and on the lower portion of ringplate 50 is 5°. The tapered tube 48 provides a neck-down ratio (that is the ratio of the diameter of the molten dope at the bottom of the tube 48 to diameter of the finished fibre) of 3.8 to 1. The neck down ratio may be in the range of 1.4:1 to 10:1.

The coating fluid inlet 36 leads to a coating fluid delivery passageway 51 in communication with an annular chamber 52 formed by a recess in the bottom of the body 34 and the die plate 50. Coating fluid is discharged from chamber 52 into passageways 53 formed in the die plate 50 which exit into an annular chamber 54 formed between the bottom of the die plate 50 and ring plate 51.

The ring plate 51 is secured to the body 34 by bolt 55. "O" ring 56 provides a seal between the ring plate 51, die plate 50 and body 34 and "O" ring 57 provides a seal between die plates 50 and body 34. A central bore 58 of the stem portion 59 of the ring plate 51 receives the fibre which is retained in hollow form by the lumen fluid and which is coated with the coating fluid.

Figure 6:
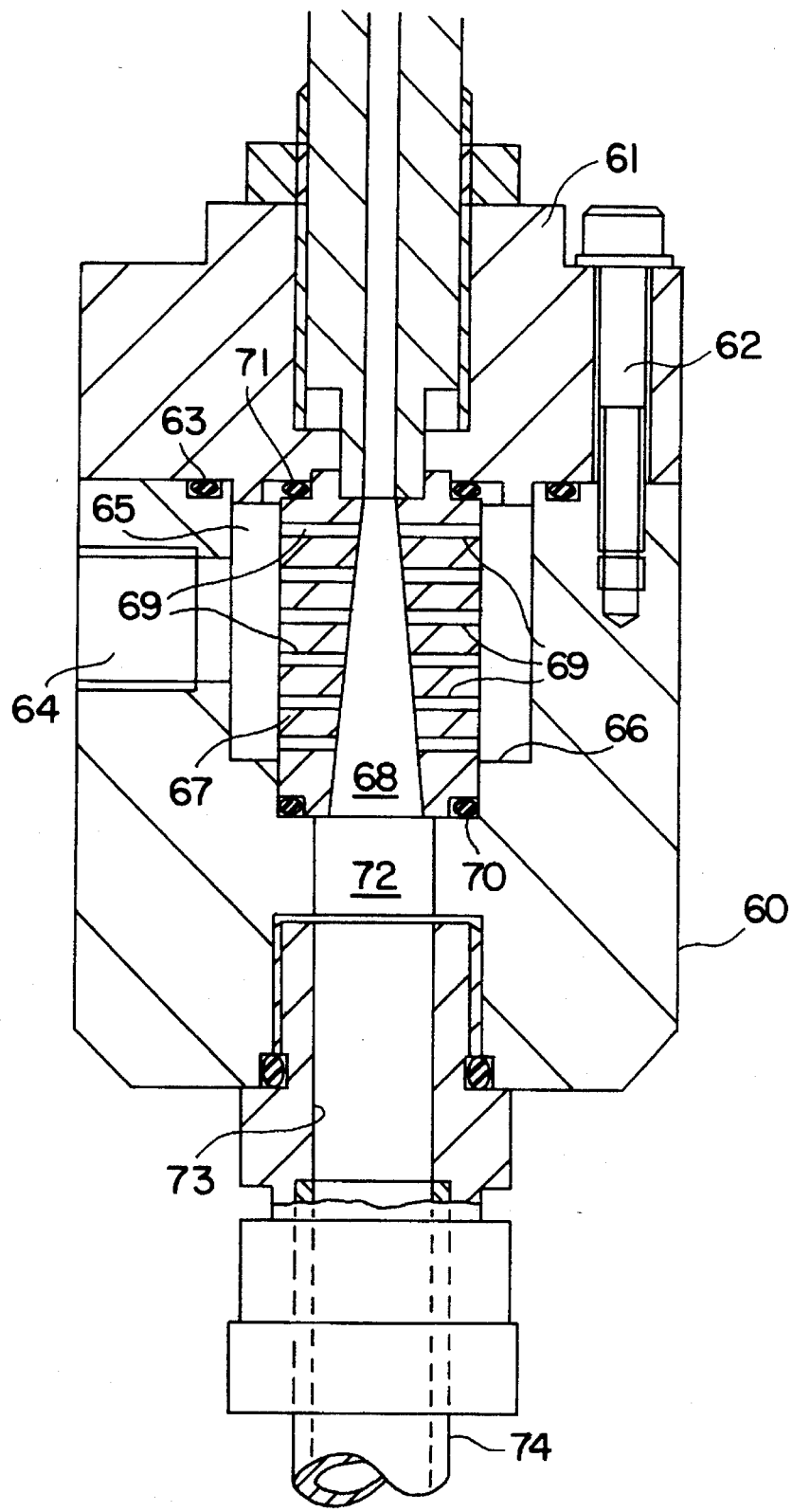

The quench tube portion 32 which is shown on an enlarged scale in FIG. 6 has a body portion 60 and a connector plate 61 secured thereto by bolt 62. "O" ring 63 provides a seal between the body 60 and plate 61. The body 60 has a quench fluid inlet 64 which leads to a quench fluid chamber 65 formed by a recess 66 is formed in the body 60.

Within the recess 66 there is a quench oil diffusor 67 having an axial bore 68. Passageways 69 connect the chamber 65 to the bore 68.

"O" ring 70 seals the diffusor 67 with respect to the body 60 and "O" ring 71 seals the diffusion 67 with respect to the connector plate 61. The bore 68 of the diffusor 67 is in communication with the bore 72 of body 60 which in turn is in communication with the bore 73 of discharge tube 74.

FIG. 7 is an enlarged view of the discharge nozzle 42 which, in this instance, is modified to be in the nature of a needle 80 having a plurality of protrusions 81 which act to self centre the needle 80 within the chamber 48.

DESCRIPTION OF THE PREFERRED EMBODIMENTS

The invention will now be described with reference to the production of porous hollow fibre membranes.

Example 1

A hollow fibre polyvinylidene fluoride membrane was prepared using the extrusion apparatus illustrated in FIGS. 4 to 7. A mixture of 30.0% KYNAR® 461® (a trademark for polyvinylidene fluoride), 30% glycerol triacetate, 39.9% Digol (the trivial name for diethylene glycol) and 0.1% ETHANOX 330® (Ethanox 330 is a trade mark for 1,3,5-trimethyl-2,4,6-tris-3,5-di-tert-butyl-4-hydroxybenzyl) benzene) as an antioxidant was prepared and then mixed together whilst heating under partial vacuum to a temperature of 220° C. to form a dope. The dope was held at this temperature in a holding tank (not shown) while being progressively introduced to the extruder through inlet 35. The flow rate of the dope was 20 cc/min. and the extrusion temperature was 215° C.

A lumen forming fluid (digol) which enters the extruder through inlet 39 and ultimately passes through the tapered end 43 of nozzle 42 was introduced. As dope is discharged from fibre-forming tube 48 into central bore 58, the role of the lumen forming fluid discharged from nozzle 42 is to maintain the lumen in the hollow fibre being formed. The flow rate of the/umen-forming fluid was 6.0 cc/min.

As the hollow fibre was extruded, a coating fluid comprising a mixture of 10% glycerol triacetate and 90% digol was discharged from passageway 53 to coat the formed hollow fibre as it entered the central bore. The flow rate of the coating fluid was 15 cc/min.

Both lumen-forming and coating fluids were at essentially the same temperature as the dope.

The formed hollow fibre passes through the central bore of the extruder to the quench region shown in FIG. 6 where digol was used as the quench fluid. The temperature of the digol was about 67° C. and it was introduced at a flow rate of 800 cc/min.

The hollow fibre was discharged from the extruder at a haul-off rate of 60 m/min. As the velocity of the extruded dope is 5.8 m/min there was a drawdown factor of 10.3 and substantial stretching of the fibre occurred.

The finished fibre had a pore size of 0.3 micron and a water permeability of 141 ml/min/m at a pressure of 100 kPa. The membrane had a lacey structure and orientation of the strands was evident. These features are clearly seen in FIG. 1a and FIG. 1b.

Example 2

35% of KYNAR 461® and 0.1% of ETHANOX 330® were dissolved in 30% GTA and 34.9% Digol at 225° C. This was extruded at 215° C. as the second stream in the extruder of Example 1. The first and fourth streams were Digol but the third stream was 50/50 GTA/Digol. Fibre was produced at 60 meter/minute with a mean pore size of 0.21 microns.

Example 3

A dope comprising 11.75% KYNAR 461®, 11.75% SOLEF 1015® (a trademark for polyvinylidene fluoride), 30% glycerol triacetate, 46.4% digol and 0.1% ETHANOX 300® was extruded at 220° C. as the second stream in the extruder of Example 1. The flow rate was 23 cc/min.

The lumen and quench streams were both digol and the flow rate of these streams was 5.5 cc/min and 300 cc/min respectively. The coating liquid was a 50/50 mixture of glycerol triacetate and digol. The flow rate of the coating stream was 8 cc/min. The quench liquid was at a temperature of 30° C.

The fibre was hauled off the extruder at 60 m/min. As the velocity of the extruded dope was 6.7 m/min there was a drawdown factor of 9 and substantial stretching of the fibre occurred.

The finished fibre has a pore size of 0.29 micron and a water permeability of 170 ml/min/m at a pressure of 100 kPa. The fibre lumen diameter was 0.35 mm and its outer diameter was 0.65 mm.

Example 4

Using the same, respective compositions of dope and other fluids as in Example 3, but reducing the dope flow and lumen flow rates by one-third, i.e. to 15.33 and 3.67 mls/min respectively, and correspondingly reducing the fibre speed to 40 meters/minute to maintain the same drawdown factor and fibre dimensions, the resulting fibre had a mean pore size of 0.24 micron, and a water permeability of 135 mls/min/meter/100 kPa. The change in membrane properties compared to Example 3 can be attributed to the higher coating fluid and quench fluid flow rates relative to the flow rate of the extruded dope.

Example 5

The same respective compositions of dope, lumen and quench fluids were used as in Example 3. However, the coating fluid was changed to a 60/40 Digol/GTA mix. All other operating conditions were essentially the same as for Example 3. The resulting fibre had a mean pore size of 0.37 micrometers and a water permeability rate of 262 mls/min/metre/100 kPa. The change in membrane properties compared to Example 3 can be attributed to the different composition of the coating fluid mixture.

Example 6

Example 5 was repeated with the only change being a reduction in the temperatures of the dope, lumen and coatings fluids to 210° C. The resulting fibre had a mean pore size of 0.30 micrometers and a water permeability rate of 183 mls/min/meter/100 kPa.

Example 7

A solution (dope) was made at 220° C. comprising 12.5% KYNAR 461®, 12.5% Solef 1015, 30% GTA, 44.9% Digol, and 0.1% antioxidant (ETHANOX 330®). This was extruded at 220° C. as the second stream in the apparatus used in the previous examples. The first (lumen) and fourth (quench) streams were Digol, while the third (coating-).stream comprised a mixture of 57/43 Digol/GTA. The/umen and coating streams were at essentially the same temperature as the dope stream, whereas the quench temperature was 28° C. The flow rates of the dope, lumen, coating, and quench streams were respectively 23, 7, 10 and 500 mls/min.

The fibre was produced at 60 meters/minute and had a mean pore size of 0.28 micrometers and a water permeability rate of 160 mls/min/meter/100 kPa.

Example 8

A solution (dope) was made at 210° C. comprising KYNAR 461®, 30.0% GTA, 39.9% Digol, and 0.1% antioxidant. This was extruded at 210° C. in the apparatus used in the previous examples. Digol was used for the lumen and quench streams and a 57/43 Digol/GTA mix used for the coating stream. The lumen, dope and coating streams were essentially at the same temperature, whereas the quench stream temperature was 60° C. The flow rates of the dope, lumen, coating and quench streams were respectively 20, 6 15, and 700 m/s/min.

The fibre was produced at 60 meters/min with an extruded dope velocity of 5.8 meters/min, representing a drawdown factor of 10.3, and had a pore size of 0.51 micrometers and a water permeability rate of 306 mls/min/meter/100 kPa. The larger pore size is attributed largely to the higher quench temperature than used in the previous examples.

The conditions under which the membrane is extruded in examples 1 to 8 are summarised in Table 1. Additional examples 9, 10 and 11 which were carried out following the procedure of example 1 are also summarised in Table 1.

Various modifications may be made in details of process steps and composition selection without departing from the scope or ambit of the invention. For instance, although the specification primarily addresses the use of PVdF homopolymers in a process for producing hollow fibre membranes, it should be apparent to the skilled addressee that PVdF copolymers or mixtures with suitable polymers may be used and that the process may be adapted for the formation of flat sheet membranes.

TABLE 1

| | DOPE COMPOSITION | | | | | | | TEMPERATURES | |
|---|---|---|---|---|---|---|---|---|---|
| | PVdF | | SOLVENT SYSTEM | | COMPOSITION OF OTHER STREAMS | | | DOPE | |
| Example Number | KYNAR 461 % | SOL-EF 1015/1001 % | GTA % | DIGOL % | LUMEN | COATING | QUENCH | EXTN °C. | QUENCH °C. |
| 1 | 30.0 | — | 30 | 39.9 | DIGOL | 90 DIGOL 10 GTA | DIGOL | 215 | 67 |
| 2 | 35.0 | — | 30 | 34.9 | DIGOL | 50 DIGOL 50 GTA | DIGOL | 215 | 47 |
| 3 | 11.75 | 11.75 | 30 | 46.4 | DIGOL | 50 DIGOL 50 GTA | DIGOL | 220 | 30 |
| 4 | 11.75 | 11.75 | 30 | 46.4 | DIGOL | 50 DIGOL 50 GTA | DIGOL | 220 | 30 |
| 5 | 11.75 | 11.75 | 30 | 46.4 | DIGOL | 60 DIGOL 40 GTA | DIGOL | 220 | 30 |
| 6 | 11.75 | 11.75 | 30 | 46.4 | DIGOL | 60 DIGOL 40 GTA | DIGOL | 210 | 30 |
| 7 | 12.5 | 12.5 | 30 | 44.9 | DIGOL | 57 DIGOL 43 GTA | DIGOL | 220 | 28 |
| 8 | 30.0 | — | 30 | 39.9 | DIGOL | 57 DIGOL 43 GTA | DIGOL | 210 | 60 |
| 9 | 11.25 | 11.25 | 30 | 47.4 | DIGOL | 57 DIGOL 43 GTA | DIGOL | 220 | 30 |
| 10 | 11.25 | 11.25 | 30 | 47.4 | DIGOL | 50 DIGOL 50 GTA | DIGOL | 220 | 29 |
| 11 | 11.25 | 11.25 | 30 | 47.4 | DIGOL | 70 DIGOL 30 GTA | DIGOL | 220 | 30 |

TABLE 1-continued

| Example Number | FLOW RATES CC/MIN | | | | HAUL OFF RATE M/MIN | AVGE PORE SIZE | WATER* PERM. | ANTIOXIDANT ETHANOX 330% |
|---|---|---|---|---|---|---|---|---|
| | DOPE | LUMEN | COATING | QUENCH | | | | |
| 1 | 20 | 6 | 15 | 800 | 60 | 0.3 | 141 | 0.1 |
| 2 | 15 | 6 | 11 | 800 | 60 | 0.21 | 76 | 0.1 |
| 3 | 23 | 5.5 | 8 | 300 | 60 | 0.29 | 170 | 0.1 |
| 4 | 15.33 | 3.66 | 8 | 300 | 40 | 0.24 | 135 | 0.1 |
| 5 | 23 | 5.5 | 8 | 300 | 60 | 0.37 | 262 | 0.1 |
| 6 | 23 | 5.5 | 8 | 300 | 60 | 0.30 | 183 | 0.1 |
| 7 | 23 | 7 | 10 | 500 | 60 | 0.28 | 160 | 0.1 |
| 8 | 20 | 6 | 15 | 700 | 60 | 0.51 | 306 | 0.1 |
| 9 | 23 | 5.5 | 8 | 300 | 60 | 0.38 | 198 | 0.1 |
| 10 | 23 | 5.5 | 15 | 500 | 60 | 0.25 | 82 | 0.1 |
| 11 | 23 | 5.5 | 15 | 500 | 60 | 0.29 | 141 | 0.1 |

*WATER PERMEABILITY UNITS: mls/min/meter @ 100 KPa

We claim:

1. A method of making a porous polymeric hollow fiber membrane comprising the steps of: (a) heating a mixture comprising polyvinylidene fluoride (PVdF) and a solvent system, initially comprising a first component that is a latent solvent for PVdF and a second component that is a non-solvent for PVdF, wherein at elevated temperature PVdF dissolves in the solvent system to provide an optically clear solution, (b) introducing said solution into an extrusion head adapted to form the solution into a hollow fiber membrane form extruded co-axially with a lumen-forming fluid, a coating liquid that is introduced around the outer surface of the hollow fiber and a cooling liquid that is introduced around the coating liquid, (c) rapidly cooling the solution so that non-equilibrium liquid-liquid phase separation takes place to form a continuous polymer rich phase and a continuous polymer lean phase with the two phases being intermingled to form a bicontinuous matrix of large interfacial area;

(d) continuing cooling until the polymer rich phase solidifies to form a porous hollow fiber membrane, and (e) removing the solvent system from said porous hollow fiber membrane.

2. A method according to claim 1 wherein the mixture additionally contains an antioxidant.

3. A method according to claim 1 wherein the mixture is heated for a period of between about 1 and about 20 hours.

4. A method according to claim 1 wherein the coating liquid comprises a mixture of the latent solvent and the non-solvent that formed the solvent system, whereby the proportion of the latent solvent and non-solvent are chosen to predetermine the pore size and frequency of the pores on the membrane surfaces.

5. A method according to claim 1 or claim 4 wherein air, gas or vapour, other than gas or vapour serving as lumen fluid, is excluded during extrusion.

6. A method according to claim 1 wherein the fibre is stressed axially during the cooling step to stretch it by a factor ranging from 5 to 100, thereby elongating the surface pores.

7. A method according to claim 1 wherein the first component of the solvent system is a glycerol ester.

8. A method according to claim 7 wherein said first component is selected from the group consisting of glycerol triacetate, glycerol tripropionate, glycerol tributyrate and partially-esterified glycerol.

9. A method according to claim 1 wherein the second component of the solvent system is a high boiling point, polar compound that is capable of hydrogen bonding.

10. A method according to claim 9 wherein said second component is a higher alcohol, glycol or polyol.

11. A method according to claim 10 wherein said second component is selected from the group consisting of glycerol, diethylene glycol, dipropylene glycol, polyethylene glycol and polypropylene glycol.

12. A method according to claim 1 wherein the mixture comprises polyvinylidene fluoride, glycerol triacetate, diethylene glycol and an antioxidant.

* * * * *